US009232553B2

(12) United States Patent
Park et al.

(10) Patent No.: US 9,232,553 B2
(45) Date of Patent: Jan. 5, 2016

(54) METHOD AND APPARATUS FOR SECURE PAIRING IN WIRELESS COMMUNICATION

(75) Inventors: Yong-suk Park, Seoul (KR); Tae-joon Park, Goyang-si (KR)

(73) Assignees: SAMSUNG ELECTRONICS CO., LTD., Suwon-si (KR); INDUSTRY-UNIVERSITY COOPERATION FOUNDATION KOREA AEROSPACE UNIVERSITY, Goyang-si (KR)

( * ) Notice: Subject to any disclaimer, the term of this patent is extended or adjusted under 35 U.S.C. 154(b) by 149 days.

(21) Appl. No.: 13/092,403

(22) Filed: Apr. 22, 2011

(65) Prior Publication Data
US 2012/0083298 A1 Apr. 5, 2012

(30) Foreign Application Priority Data
Oct. 4, 2010 (KR) .................. 10-2010-0096523

(51) Int. Cl.
H04B 7/00 (2006.01)
H04W 76/04 (2009.01)
H04W 12/04 (2009.01)
H04W 8/00 (2009.01)
H04W 84/12 (2009.01)

(52) U.S. Cl.
CPC .............. *H04W 76/04* (2013.01); *H04W 12/04* (2013.01); *H04W 8/005* (2013.01); *H04W 84/12* (2013.01)

(58) Field of Classification Search
CPC ..... H04W 12/04; H04W 76/14; H04W 8/005; H04W 84/12
USPC .............. 455/410, 411, 41.1, 41.2, 41.3, 436, 455/437, 438
See application file for complete search history.

(56) References Cited

U.S. PATENT DOCUMENTS

2007/0123165 A1* 5/2007 Sheynman et al. .......... 455/41.2
2009/0156123 A1* 6/2009 Kim ............................ 455/41.2

* cited by examiner

*Primary Examiner* — Ping Hsieh
(74) *Attorney, Agent, or Firm* — Sughrue Mion, PLLC (57) ABSTRACT

Provided is a wireless connection device including a selection information generating unit which generates selection information with respect to each external device of a plurality of external devices that transmitted signals for wireless connection; a selecting unit which compares the selection information regarding each external device of the plurality of external devices and selects an optimal device from among the plurality of external devices based on a result of the comparison; and a connection processing unit which establishes a wireless connection to a first external device, among the plurality of external devices, that first transmitted the signal for wireless connection, and, if the first external device is different from the optimal external device, terminates the wireless connection to the first external device and establishes a wireless connection to the optimal external device.

19 Claims, 7 Drawing Sheets

METHOD AND APPARATUS FOR SECURE PAIRING IN WIRELESS COMMUNICATION

CROSS-REFERENCE TO RELATED PATENT APPLICATION

This application claims priority from Korean Patent Application No. 10-2010-0096523, filed on Oct. 4, 2010 in the Korean Intellectual Property Office, the disclosure of which is incorporated herein in its entirety by reference.

BACKGROUND

1. Field

Method and apparatuses consistent with exemplary embodiments generally relate to wireless communication, and more particularly, to a method and an apparatus for secure pairing in a push button configuration (PBC).

2. Description of the Related Art

A PBC is a method for establishing pairing between devices using wireless communication protocols, such as radio frequency for consumer electronics (RF4CE) or Wi-Fi.

When a user wants to connect two devices A and B to each other, the devices A and B may be connected to each other via a PBC as follows.

First, the two devices to be connected to each other include PBC buttons. A user presses a PBC button of the device A and then presses a PBC button of the device B, or vice versa.

Then, a pairing protocol is performed between the devices A and B, and thus a wireless connection is established therebetween.

Therefore, a user may connect devices to each other by simply pressing buttons of the devices without intensive knowledge on wireless connection.

However, in a PBC environment in which a user wants to connect two devices to each other, a third device may be intentionally, maliciously or coincidentally connected to one of the two devices.

SUMMARY

Exemplary embodiments provide a method and an apparatus for wireless connection for resolving such vulnerability in security and providing secure device connections and a computer-readable recording medium having recorded thereon a computer program for implementing the wireless connection.

According to an aspect of an exemplary embodiment, there is provided a wireless connection device including a selection information generating unit which generates selection information with respect to each external device of a plurality of external devices that transmitted signals for wireless connection; a selecting unit which compares the selection information regarding each external device of the plurality of external devices and selects an optimal device from among the plurality of external devices based on a result of the comparison; and a connection processing unit, which establishes a wireless connection to a first external device, among the plurality of external devices, that first transmitted the signal for wireless connection, and, if the first external device is different from the optimal external device, terminates the wireless connection to the first external device and establishes a wireless connection to the optimal external device.

The selection information may be a received signal strength (RSS) value of a signal for wireless connection transmitted by each external device of the plurality of the external devices.

The selecting unit may selects, from among the plurality of external devices, an external device corresponding to the largest RSS value as the optimal external device.

The selection information may be a round trip time (RTT) value between an external device of the plurality of external devices and the wireless connection device.

The selecting unit may select, from among the plurality of external devices, an external device corresponding to the smallest RTT value as the optimal external device.

The selection information generating unit may generate corresponding selection information only with respect to external devices that transmitted the signal for wireless connection during a predetermined wait time.

The signal for wireless connection may be a signal responding to a wireless connection request transmitted by one of the plurality of external devices corresponding to a signal requesting wireless connection transmitted by the wireless connection device.

The wireless connection device may further include a button input unit, which generates, in response to an input from a user, a button input signal instructing the wireless connection device to transmit the signal requesting wireless connection.

The button input signal may be generated when a user presses a physical button or manipulates a software interface.

The connection processing unit may receive the signal for wireless connection from the first external device from the plurality of external devices and immediately establishes wireless connection to the first external device from the plurality of external devices.

According to an aspect of another exemplary embodiment, there is provided a method of wireless connection, the method including generating selection information with respect to each external device of a plurality of external devices that transmitted signals for wireless connection; establishing wireless connection to a first external device, among the plurality of external devices, that first transmitted the signal for wireless connection; comparing the selection information regarding the plurality of external devices and selecting an optimal external device from among the plurality of external devices based on the comparing; and, if the first external device is different from the optimal external device, terminating the wireless connection to the first external device and establishing a wireless connection to the optimal external device.

The selection information may be an RSS value of a signal for wireless connection that is transmitted by each external device of the plurality of external devices, and an external device corresponding to the largest RSS value may be selected as the optimal external device.

The operation of generating selection information may include generating corresponding selection information only with respect to one of the plurality of external devices that have transmitted the signal for wireless connection during a predetermined wait time.

The signal for wireless connection may be a signal responding to a wireless connection request transmitted by one of the plurality of external devices corresponding to a signal requesting wireless connection transmitted by the wireless connection device.

The method may further include generating a button input signal in response to an input from a user; and transmitting the signal requesting wireless connection in response to the button input signal.

The button input signal may be a signal generated when a user presses a physical button or manipulates a software interface.

The operation of establishing wireless connection to the first external device may be performed immediately after the operation of receiving the signal for wireless connection from the first external device from the plurality of external devices is performed.

The method may further include receiving a signal for requesting a wireless connection from one of the plurality of external devices; receiving a button input from a user; and transmitting a signal responding to the wireless connection request to the one of the plurality of external devices.

According to an aspect of another exemplary embodiment, there is provided a non-transitory computer-readable recording medium storing a computer-readable program which when executed by a computer performs a method of wireless connection, the method including generating selection information with respect to each external device of a plurality of external devices that transmitted signals for wireless connection; establishing wireless connection to a first external device, among the plurality of external devices, that first transmitted the signal for wireless connection; comparing the selection information regarding the plurality of external devices and selecting an optimal external device from among the plurality of external devices based in a result of the comparison; and, if the first external device is different from the optimal external device, terminating the wireless connection to the first external device and establishing a wireless connection to the optimal external device.

BRIEF DESCRIPTION OF THE DRAWINGS

The above and/or other aspects will become more apparent by describing in detail exemplary embodiments with reference to the attached drawings in which.

DETAILED DESCRIPTION OF EXEMPLARY EMBODIMENTS

Exemplary embodiments will now be described more fully with reference to the accompanying drawings, in which exemplary embodiments of the invention are shown.

The term "unit" as used herein means a hardware component and/or a software component that is executed by a hardware component such as a processor.

Figure 1:
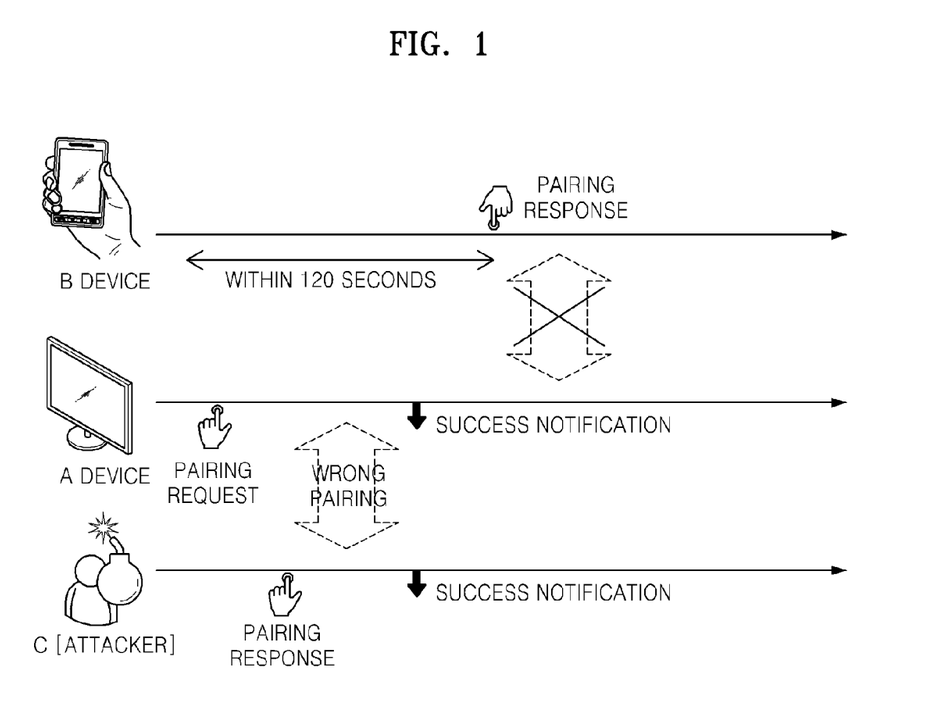
FIG. 1 is a schematic diagram showing an example of situations in which a third device is connected to a device in a general PBC environment.

FIG. 1 is a schematic diagram showing an example of situations in which a third device C is connected to device A in a general PBC environment.

FIG. 1 shows that a user attempts to connect two devices A and B to each other. If a user presses a button of one of the devices and then presses a button of the other device within a predetermined time, a wireless connection is established between the two devices. FIG. 1 shows an example in which the predetermined time is 120 seconds.

First, when the user presses a button of the device A, the device A transmits a signal requesting wireless connection. FIG. 1 shows a pairing request signal as an example of signals requesting wireless connection.

When the user presses a button of the device B, the device B transmits a signal responding to a wireless connection request. FIG. 1 shows a pairing response signal as an example of signals for responding to a wireless connection request.

Hereinafter, a case in which a malicious device C exists will be described.

It is assumed that the user presses the button of the device A first. The user will then move to the device B to press the button of the device B.

However, if there is a malicious device C, the malicious device C may detect that the button of the device A is pressed and may transmit a signal for establishing a connection to the device A before the user presses the button of the device B. Here, a connection protocol is performed between the device A and the malicious device C, and thus a wireless connection is established between the device A and the malicious device C (establishment of a wrong pairing). In this case, even if the user presses the button of the device B, an attempt of the device B for wireless connection fails.

Furthermore, if the user presses the button of the device A and another user coincidentally presses a button of another PBC device D (not shown) before the user presses the button of the device B, a wireless connection is established between the device A and the device D. Therefore, if the user presses the button of the device B thereafter, an attempt of the device B for wireless connection fails.

Figure 2:
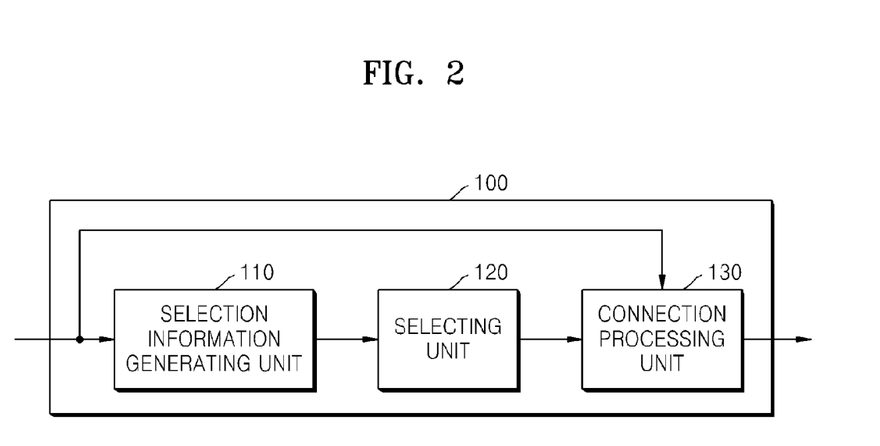
FIG. 2 is a block diagram of a configuration of a wireless connection device according to an exemplary embodiment.

FIG. 2 is a block diagram of a configuration of a wireless connection device 100 according to an exemplary embodiment.

Referring to FIG. 2, the wireless connection device 100 may include a selection information generating unit 110, a selecting unit 120, and a connection processing unit 130.

The selection information generating unit 110 generates selection information with respect to each of a plurality of external devices that have transmitted signals for wireless connection.

A signal for wireless connection is a signal transmitted by an external device to establish a wireless connection. Examples of signals for wireless connection may include a pairing response signal, which is an example of signals for responding to a wireless connection request.

Selection information is information required to select one of a plurality of external devices as an optimal external device. Detailed description thereof will be given below.

The selection information generating unit 110 may generate corresponding selection information with respect to only an external device which has transmitted a signal for wireless connection during a predetermined wait time. The wait time may vary. Although FIG. 1 shows a case in which the wait time is 120 seconds, the wait time of the exemplary embodiments are not limited thereto.

The selecting unit 120 compares selection information generated by the selection information generating unit 110 and selects one of a plurality of external devices as an optimal external device.

An optimal external device refers to an external device a user intends to connect with the wireless connection device 100. In FIG. 1, the device B is the optimal external device.

In the wireless connection device 100, an optimal external device is determined by comparing selection information generated by the selection information generating unit 110. Examples of selection information include a received signal strength (RSS) value of a signal for wireless connection that is transmitted by an external device and a round trip time (RTT) value between an external device and the wireless connection device 100. However, the selection information of the exemplary embodiments is not limited to RSS and RTT values.

A case in which an RSS value of a signal for wireless connection that is transmitted by an external device is used as selection information will be described as follows.

The malicious device C is generally located away from the wireless connection device 100, and an obstacle, such as a wall, may be located therebetween. Therefore, the strength of a signal received from the malicious device C is usually weaker than the strength of a signal received from the optimal external device B. Therefore, an optimal external device B may be determined by comparing RSS values of each external device.

When the selection information generating unit 110 generates an RSS value of a signal transmitted by an external device, the selecting unit 120 selects an external device corresponding to the largest RSS value from among a plurality of external devices as an optimal external device. In FIG. 1, the device B corresponds to the largest RSS value, and thus the device B will be selected as an optimal external device.

Using RSS values as selection information will induce additional effects, such as increasing transmission power, of a malicious device, and thus the overall attack will be mitigated.

Next, a case in which an RTT value between an external device and the wireless connection device 100 is used as selection information will be described below According to an exemplary embodiment, a distance between the wireless connection device 100 and an external device is estimated, and, if the estimated distance exceeds a predetermined limit, the external device may be determined as a malicious device and a device closest to the wireless connection device 100 may be selected as a desired device, that is, an optimal external device. An RTT value between devices may be used for distance estimation.

For example, to measure a distance between the device A and the device B, when the device A transmits a challenge signal to the device B, the device B transmits a response signal in response to the challenge signal. The device A measures a total lapse of time from transmission of the challenge signal to reception of the response signal, that is, a round trip time (RTT) and may calculate a distance between the device A and the device B by applying the RTT to Equation 1 below.

$$\text{Distance} = \text{RTT} * \text{Traveling Speed of Signal} \quad \text{[Equation 1]}$$

In the exemplary embodiment, an optimal external device B may be selected by using an RTT value as selection information instead of calculating a distance.

When the selection information generating unit 110 receives signals for wireless connection from each external device, the selection information generating unit 110 transmits challenge signals to each of the external devices and waits for response signals. When response signals are received, total lapses of time are stored as RTT values. The selecting unit 120 compares stored RTT values and selects an external device corresponding to the smallest RTT value as an optimal external device.

In FIG. 1, the distance between the wireless connection device 100 and the device B is shorter than the distance between the wireless connection device 100 and the malicious device C. Therefore, the RTT value between the wireless connection device 100 and the device B is less than the RTT value between the wireless connection device 100 and the malicious device C. Therefore, the device B corresponding to the smallest RTT value will be selected as an optimal external device.

In case of using an RTT value as selection information, an optimal external device B may be selected even if a malicious device attempts to disguise itself as an optimal external device by increasing transmission power and transmitting an abnormally strong signal, for example, and thus the wireless connection device 100 may provide higher security.

The connection processing unit 130 operates at two times.

First, the connection processing unit 130 operates at a time at which an external device initially transmits a signal for wireless connection. When the signal for wireless connection is received from the external device, the connection processing unit 130 performs a wireless connection to the external device, which has transmitted the signal.

Next, the connection processing unit 130 operates at a time at which the selecting unit 120 selects an optimal external device. The connection processing unit 130 determines whether the external device, to which wireless connection is initially performed, (referred to hereinafter as a "first external device") and the optimal external device are the same.

If the optimal external device and the first external device are the same, the established wireless connection is with a device desired by a user, and thus no further operation is necessary.

However, if the optimal external device is different from the first external device, the established wireless connection is with a malicious device. Therefore, the connection processing unit 130 terminates wireless connection to the first external device and performs wireless connection to the optimal external device.

Here, the connection processing unit 130 may include a wireless transmitting unit. Alternatively, the connection processing unit 130 may transmit a control signal to a wireless transmitting unit (not shown) outside the connection processing unit 130.

In the wireless connection device 100 according to an embodiment, when signal for wireless connection is received from an external device, a first wireless connection is established with the external device. Next, an optimal external device is determined by comparing selection information with respect to external devices, and the first wireless connection is terminated and a new wireless connection is established with the optimal external device only if the external device, to which the first wireless connection is established, is not the optimal external device. In other words, the wireless connection device 100 employs a post-verification algorithm.

As discussed below, post-verification algorithm has advantages, compared to a pre-verification algorithm, in which it is verified whether a device to be connected is an appropriate device before a wireless connection is established thereto.

Considering a case in which a wireless connection is first established to an optimal external device, that is, a device desired by a user, a longer period of time is taken to establish a wireless connection to the optimal external device due to a verification process in the pre-verification algorithm. However, in the wireless connection device 100, verification is performed after a wireless connection is established, and thus wireless connection may be established relatively quickly.

Furthermore, the pre-verification algorithm requires a reference value for comparison in advance. For example, when using an RTT value as selection information, a reference RTT value in a connection device needs to be stored. Since the reference RTT value needs to be compared to an RTT value with respect to an external device every time one of external devices transmits a signal for wireless connection, operations overall become complicated.

However, the wireless connection device 100 selects an external device corresponding to an optimal value by comparing selection information of external devices instead of defining a reference value of selection information to be compared, and thus operations overall become simple.

Figure 3:
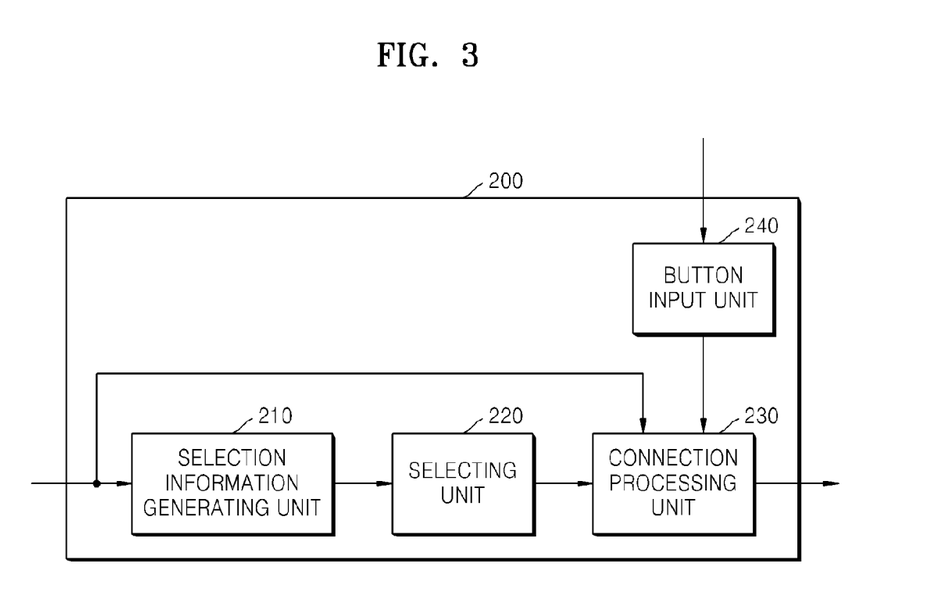
FIG. 3 is a block diagram of a wireless connection device according to another exemplary embodiment.

FIG. 3 is a block diagram of a wireless connection device 200 according to another exemplary embodiment.

Referring to FIG. 3, the wireless connection device 200 according to another exemplary embodiment may include a selection information generating unit 210, a selecting unit 220, a connection processing unit 230, and a button input unit 240. Comparing the wireless connection device 200 shown in FIG. 3 to the wireless connection device 100 shown in FIG. 2, the wireless connection device 200 further includes the button input unit 240.

The selection information generating unit 210, the selecting unit 220, and the connection processing unit 230 shown in FIG. 3 are the same as the selection information generating unit 110, the selecting unit 120, and the connection processing unit 130 shown in FIG. 2, respectively, and thus detailed descriptions thereof will be omitted.

In response to an input by a user, the button input unit 240 shown in FIG. 3 generates a button input signal instructing the wireless connection device 200 to transmit a signal requesting wireless connection.

FIG. 3 shows an example that the button input unit 240 transmits a button input signal instructing transmission of a signal requesting wireless connection to the connection processing unit 230. However, the input unit of the exemplary embodiment is not limited thereto. For example, the button input unit 240 may directly transmit a control signal instructing transmission of a signal requesting wireless connection to a transmitting unit (not shown).

A button input signal may be a signal generated when a user presses a physical button or a signal generated by software.

For example, a physical button may be provided on an external portion of the wireless connection device 200 according to the exemplary embodiment, so that a user may press the button, as shown in FIG. 1. This is an example of general PCB environments.

Alternatively, the wireless connection device 200 may operate in a device in which software is executed, such as a computer. In this case, when a program for establishing wireless connection is executed in a computer and a user presses a button in a graphical user interface of the program, a button signal may be generated by software.

When an input is received from a user, the button input unit 240 generates a button input signal instructing the wireless connection device 200 to transmit a signal requesting wireless connection. Examples of signals requesting wireless connection may include a pairing request signal.

As shown in FIG. 1, when signals requesting wireless connection are transmitted by the wireless connection device 200, external devices transmit signals for responding to a wireless connection request in response to the signals requesting wireless connection.

Figure 4:
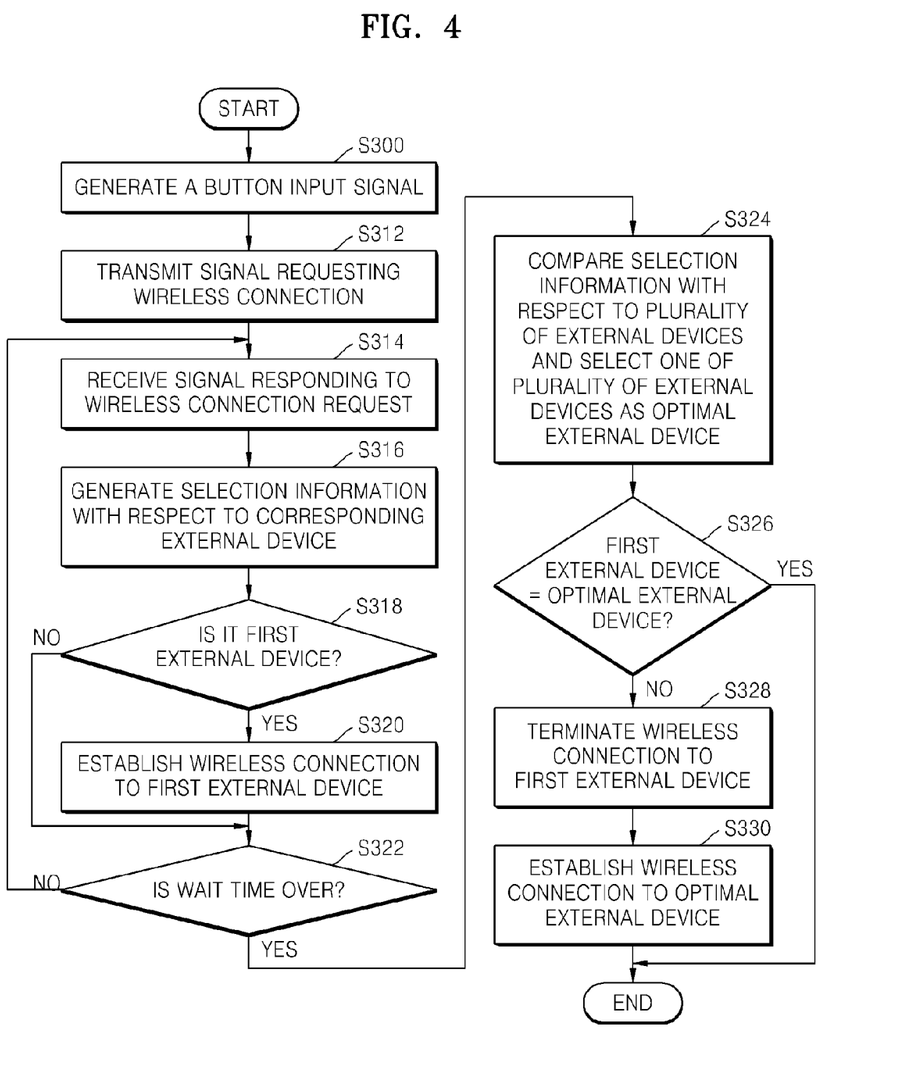
FIG. 4 is a flowchart showing a method of wireless connection, according to an exemplary embodiment.

FIG. 4 is a flowchart showing a method of wireless connection, according to an exemplary embodiment.

Referring to FIG. 4, a wireless connection device according to an exemplary embodiment generates a button input signal in response to an input from a user (operation S300). The wireless connection device may receive a button input signal from the button input unit 240 shown in FIG. 3.

The wireless connection device transmits a signal requesting wireless connection (operation S312). The signal requesting wireless connection may be a pairing request signal. However, the signal requesting wireless connection according to the exemplary embodiment is not limited thereto, and the signal requesting wireless connection may be a signal having a different name or a signal also having a different function.

The wireless connection device receives a signal responding to a wireless connection request from an external device (operation S314). The signal responding to a wireless connection request may be a pairing response signal. However, the signal responding to a wireless connection request according to an exemplary embodiment is not limited thereto, and the signal responding to a wireless connection request may be a signal having a different name or a signal further having a different function.

When the signal responding to a wireless connection request is received from the external device, the selection information generating unit 110 or 210 generates selection information with respect to a corresponding external device (operation S316). Examples of selection information include an RSS value of a signal for wireless connection that is transmitted by an external device and an RTT value between an external device and the wireless connection device. However, the exemplary embodiment is not limited thereto.

Next, it is determined whether the external device is a first external device to which a signal for wireless connection is initially transmitted (operation S318). If it is determined that the external device is the first external device to which a signal for wireless connection is initially transmitted (operation S318—YES), the connection processing unit 130 or 230 establishes a wireless connection (operation S320) to the first external device.

It is then determined whether a wait time is over (operation S322). If it determined that the wait time is not over yet, operations S314 through S320 are performed with respect to each of the plurality of external devices to which signals for wireless connection are transmitted.

When the wait time is over, the selecting unit 120 or 220 compares selection information with respect to a plurality of external devices and selects one of the plurality of external devices as an optimal external device (operation S324).

Next, it is determined whether the first external device and the optimal external device are the same (operation 326). If it is determined that the first external device and the optimal external device are the same (operation S326—YES), the established wireless connection is to the optimal external device, and thus the method is terminated.

Otherwise, if it is determined that the first external device and the optimal external device are not the same (operation S326—NO), the established wireless connection is with a malicious device, and thus the wireless connection is terminated (operation S328) and a new wireless connection is established with the optimal external device (operation S330).

Figure 5:
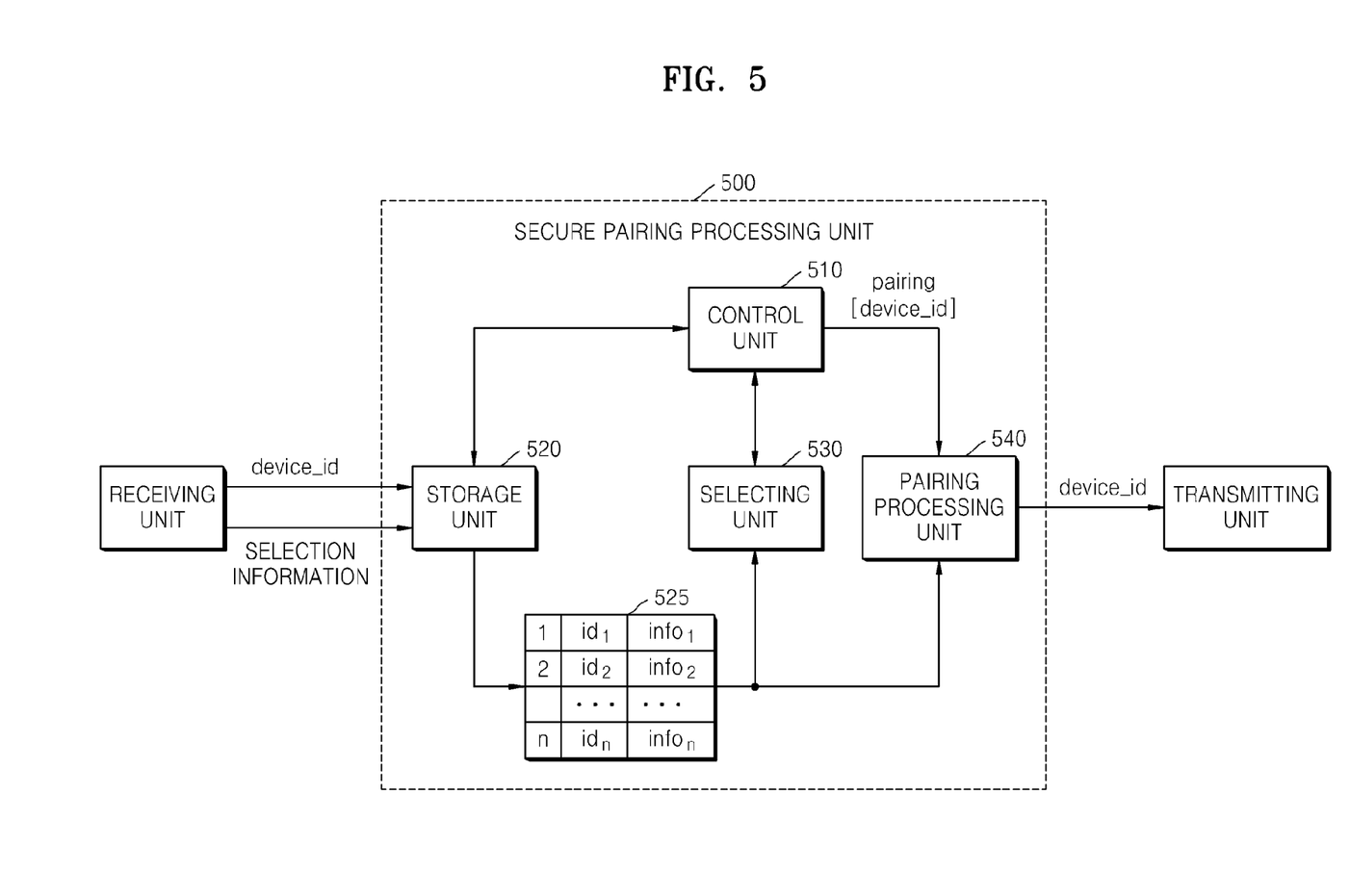
FIG. 5 is a block diagram of a configuration of a wireless connection device according to another exemplary embodiment.

FIG. 5 is a block diagram of a configuration of a wireless connection device according to another exemplary embodiment.

In FIG. 5, a receiving unit receives a signal, such as a pairing request signal or a pairing response signal, from an external device, and extracts selection information from the received signal. Furthermore, the receiving unit transmits a device identification (ID) and selection information to a secure pairing processing unit 500.

A transmitting unit transmits a signal, such as a pairing request signal or a pairing response signal, to an external device corresponding to the device ID received from the secure pairing processing unit 500.

Although FIG. 5 shows an example in which the receiving unit and the transmitting unit are separately arranged from the secure pairing processing unit 500, the receiving unit, a storage unit 520, and a memory 525 may correspond together to the selection information generating unit 110 as shown in FIG. 2. Furthermore, a pairing processing unit 540 and the transmitting unit may correspond together to the connection processing unit 130 shown in FIG. 2.

Under a control of a control unit 510, the storage unit 520 operates for a predetermined wait time after a PBC button of a device is pressed and stores a device ID and selection information, which are input by the receiving unit, in the memory 525. Furthermore, immediately after an initial pairing request is stored, the storage unit 520 informs of the storage of the initial pairing request to the control unit 510, so that a wireless connection may be established.

After the wait time is over, a selecting unit 530 operates under a control of the control unit 510. The selecting unit 530 compares selection information stored in the memory 525 and selects an optimal external device.

The pairing processing unit 540 operates according to a pairing control signal from the control unit 510. The pairing processing unit 540 instructs the transmitting unit to perform a pairing process.

The control unit 510 controls operations of the storage unit 520, the selecting unit 530, and the pairing processing unit 540. The control unit 510 receives a time point at which the initial pairing request is received, from the storage unit 520 and receives a result of selection, that is, a device ID with respect to an optimal external device from the selecting unit 530.

Furthermore, the control unit 510 performs various control operations. Detailed descriptions thereof will be given below with reference to FIG. 6.

Figure 6:
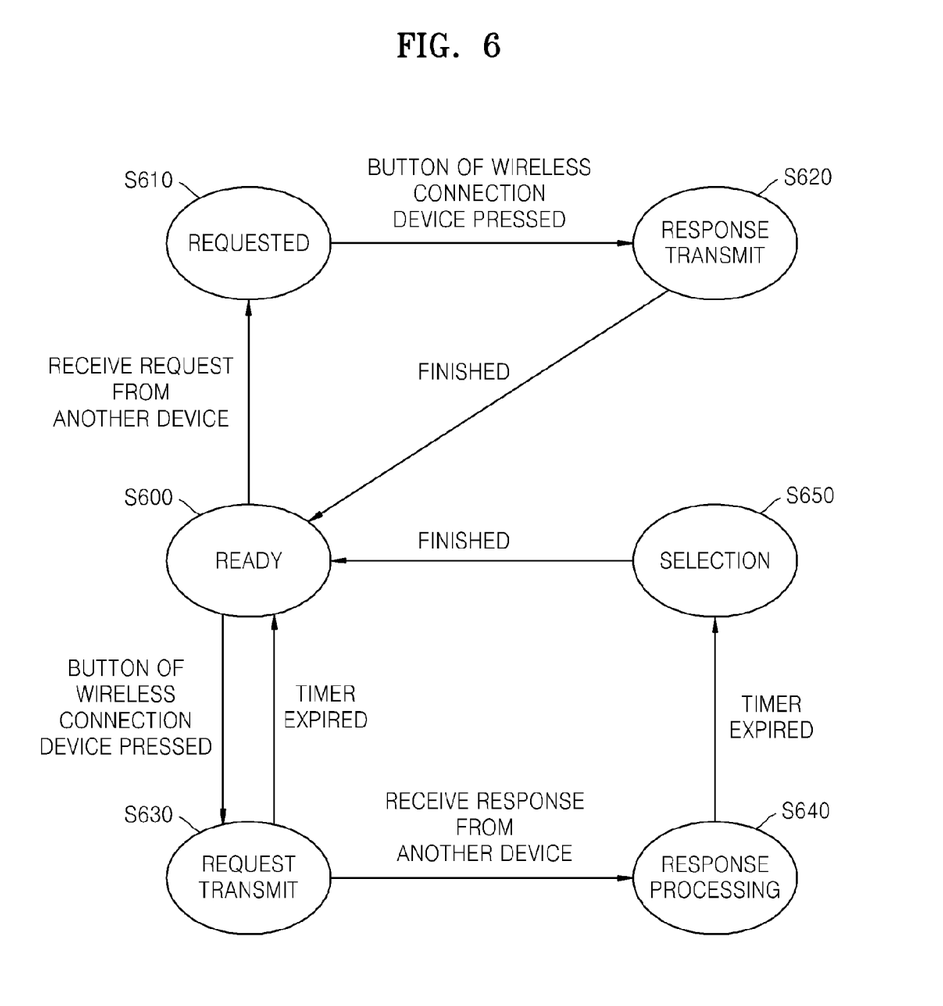
FIG. 6 is a state diagram showing state changes during the performance of a method of wireless connection, according to an exemplary embodiment.

FIG. 6 is a state diagram showing state changes during the performance of a method of wireless connection, according to an exemplary embodiment.

FIG. 6 illustrates separate processes in a case in which a button of another device is pressed first and in which a button of a wireless connection device is pressed first.

In the case where a button of another device is pressed first, the state is changed in the order of Ready S600, Requested S610, Response Transmit S620, and back to the Ready S600. In the case in which a button of a wireless connection device is pressed first, the state is changed in the order of the Ready S600, Request Transmit S630, Response Processing S640, Selection S650, and back to the Ready S600.

If a pairing request is received from another device, the Ready S600 state is transited to the Requested S610 state.

If a button of a wireless connection device is pressed first, the Ready S600 state is transited to the Request Transmit S630 state.

In the Requested state S610, a notification to press a button is provided to a user, and, when the button is pressed, the state is transited to the Response Transmit S620 state.

In the Response Transmit S620 state, the storage unit 520, illustrated in FIG. 5, is operated, and, after a response message is successfully transmitted, the state is transited to the Ready 600 state.

In the Request Transmit S630 state, a pairing request message is transmitted, and, if a response message is initially received from an external device within a wait time, the state is transited to the Response Processing S640 state. If no response message is received from an external device within the wait time, operation of the storage unit 520, illustrated in FIG. 5, is stopped, and the state is transited to the Ready S600 state without pairing.

In the Response Processing S640 state, a pairing process with respect to an external device is performed, response messages from external devices other than the first external device are received during a wait time, and device IDs and selection information are generated by parsing the response messages, and the device IDs and the selection information are stored in the memory 525, illustrated in FIG. 5.

When the wait time is over, operation of the storage unit 520 is stopped, and the state is transited to the Selection S650 state.

In the Selection S650 state, the selecting unit 530 is operated to perform the following operations.

Initially, if a response message is received from a single device, it is determined that pairing is normally completed and the state is transited to the Ready S600 state.

If response messages are received from a plurality of external devices, an optimal external device to be paired is selected by using a selection information field stored in the memory 525.

A case in which an RSS value is used as selection information will be described below.

If a first external device corresponds to the largest RSS value, the first external device is determined as an optimal external device to be paired, and thus the pairing is already normally completed. Therefore, the state is transited to the Ready S600 state.

If another device (e.g., a device B) other than the first external device corresponds to the largest RSS value, the device B is determined as an optimal external device. Therefore, wireless connection session with the first external device is terminated, a pairing process is performed with respect to the device B, which is the optimal external device, and the state is transited to the Ready S600 state.

Figure 7:
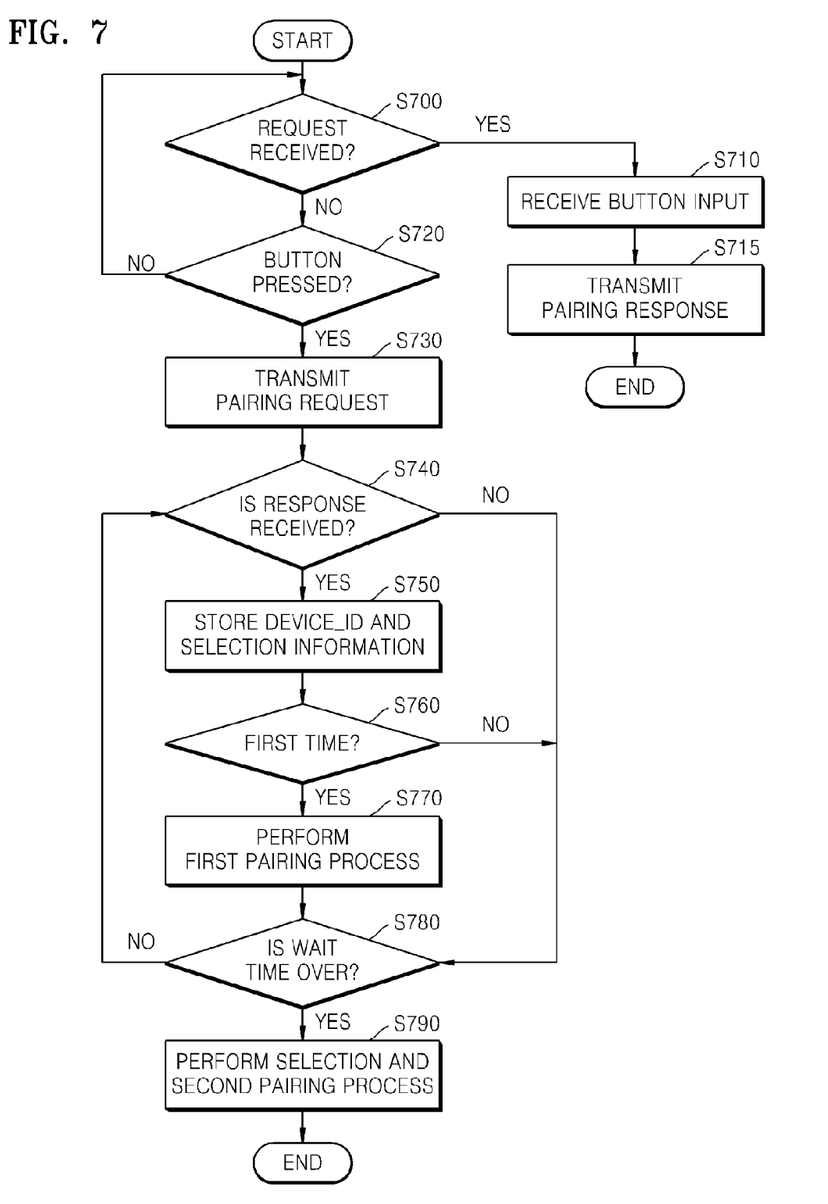
FIG. 7 is a flowchart showing a method of wireless connection, according to another exemplary embodiment.

FIG. 7 is a flowchart showing a method of wireless connection, according to another exemplary embodiment.

Initially, it is determined whether a signal requesting wireless connection is received (operation S700). If it is determined that a signal requesting wireless connection is received (operation S700—YES), a button of an external device is pressed, and thus the following operations are performed.

First, an input through a button is received from a user (operation S710), and a signal responding to a wireless connection request is transmitted to the external device (operation S715). Examples of signals for wireless connection may include a pairing response signal.

If a signal requesting wireless connection is not received (operation S700—NO), it is determined whether a button has been pressed by a user (operation S720). If there is no input from a user (operation S720—NO), operations are repeated from operations S700 and a button input of an external device or a button input of a wireless connection device to be pressed is awaited.

Otherwise, if the button of a wireless communication device is pressed first the following operations are performed.

Initially, a pairing request signal is transmitted to external devices (operation S730).

It is determined whether a pairing response signal is received from any of the external device (operation S740). If it is determined that a pairing response signal is not received, it is waited until a pairing response signal is received.

If it is determined that a pairing response signal is received from the external device (operation S740—YES), a device ID and selection information are stored (operation S750).

Thereafter, it is determined whether the corresponding external device is the first external device that has initially transmitted a signal responding to a wireless connection request (operation S760). If it is determined that the corresponding device is the first external device (operation S760—YES), a wireless connection process (a first connection process) is performed (operation S770).

It is determined whether a wait time is over (operation S780), and the operation S740 of receiving signals for responding to a wireless connection request from external devices and the operation S750 of generating and storing selection information are repeated during a predetermined wait time.

When the wait time is over, an optimal external device is selected by comparing selection information, and, if the selected optimal external device is different from the first external device, wireless connection to the first external device is terminated, and a wireless connection process (a second connection process) is performed with respect to the optimal external device (operation S790).

Figure 8:
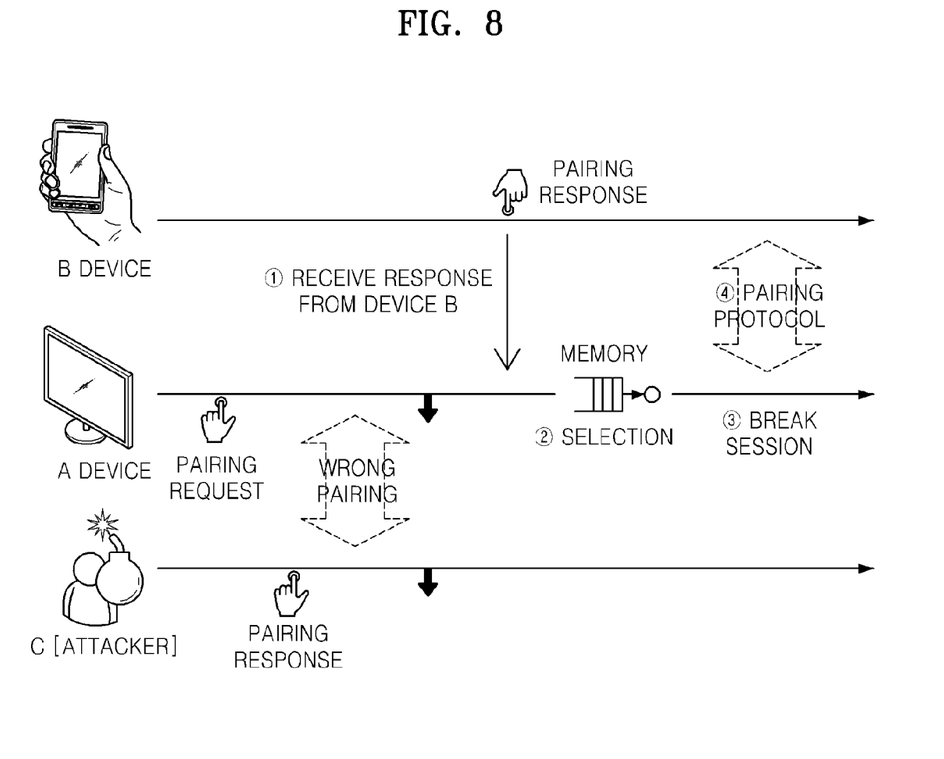
FIG. 8 is a diagram showing that a third device is connected in a PBC environment in which a wireless connection device according to an exemplary embodiment operates.

FIG. 8 is a diagram showing a third device connected in a PBC environment in which a wireless connection device according to an exemplary embodiment operates.

In FIG. 1, if a wrong wireless connection is established between a device A and a malicious device C, a wireless connection between the device A and a device B cannot be established even if a user presses a button of the device B.

A wireless connection device according to an exemplary embodiment operates as described below.

If a user presses the button of the device B, the wireless connection device generates and stores selection information also with respect to the device B.

After a wait time is over, the wireless connection device compares selection information and selects an optimal external device.

In FIG. 8, if the selection information includes RSS values, when RSS values of the malicious device C and the device B are compared, the RSS value corresponding to the device B is greater than the RSS value corresponding to the malicious device C, and thus the device B is selected as an optimal external device.

Therefore, wireless connection to the malicious device C, which is the first external device, is terminated, and a wireless connection is established with the device B, which is the optimal external device.

Therefore, a user may establish a wireless connection between the device B and the device A regardless of an attack from the malicious device C. Furthermore, a user doesn't have to know about whether there has been an attack from the malicious device C. Therefore, convenience and security may be provided for a user to establish a wireless connection.

Aspects of the inventive concept can also be embodied as computer readable codes on a computer readable recording medium. Codes and code segments for accomplishing the program can be easily construed by programmers skilled in the art to which aspects of the inventive concept pertain. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical disks, and flash memories. The computer readable recording medium can also be distributed over network coupled computer systems so that the computer readable code is stored and executed in a distributed fashion.

Although a few exemplary embodiments have been shown and described, it would be appreciated by those skilled in the art that changes may be made in the exemplary embodiments without departing from the principles and spirit of the inventive concept, the scope of which is defined in the claims and their equivalents.

What is claimed is:

1. A wireless connection device comprising:
   a selection information generating unit which generates selection information with respect to each external device of a plurality of external devices that transmitted signals for wireless connection;
   a selecting unit which compares the selection information of the plurality of external devices and selects an optimal external device from among the plurality of external devices by comparing the selection information of the plurality of external devices, without referring to, in advance, a reference value of the selection information for the comparing; and
   a connection processing unit which first establishes a wireless connection to a first external device, among the plurality of external devices, that first transmitted the signal for wireless connection, verifies whether the first external device is different from the optimal external device based on a result of the comparing the selection information of the plurality of external devices, terminates the wireless connection to the first external device based on the verification, and establishes a wireless connection to the optimal external device;
   wherein the selection information is at least one of a received signal strength (RSS) value of the signals for wireless connection transmitted by each external device of the plurality of the external devices, and a round trip time (RTT) value between an external device of the plurality of external devices and the wireless connection device.

2. The wireless connection device of claim 1, wherein the selecting unit selects, from among the plurality of external devices, an external device corresponding to a largest RSS value as the optimal external device.

3. The wireless connection device of claim 1, wherein the selecting unit selects, from among the plurality of external devices, an external device corresponding to a smallest RTT value as the optimal external device.

4. The wireless connection device of claim 1, wherein the selection information generating unit generates corresponding selection information only with respect to external devices that transmitted the signal for wireless connection during a predetermined wait time.

5. The wireless connection device of claim 1, wherein the signal for wireless connection is a signal responding to a wireless connection request transmitted by one of the plurality of external devices corresponding to a signal requesting wireless connection transmitted by the wireless connection device.

6. The wireless connection device of claim 5, further comprising a button input unit which generates, in response to an input from a user, a button input signal instructing the wireless connection device to transmit the signal requesting wireless connection.

7. The wireless connection device of claim 6, wherein the button input signal is generated when a user presses a physical button or manipulates a software interface.

8. The wireless connection device of claim 1, wherein the connection processing unit receives the signal for wireless connection from the first external device and immediately establishes wireless connection to the first external device.

9. The wireless connection device of claim 1, wherein the selection information generating unit comprises a receiving unit, a storage unit and a memory, and the storage unit operates for a predetermined wait time after a button of the wireless connection device is pressed and stores device identification and selection information of each one of the plurality of external devices in the memory.

10. A method of wireless connection, the method comprising:
generating selection information with respect to each external device of a plurality of external devices that transmitted signals for wireless connection;
establishing wireless connection to a first external device, among the plurality of external devices, that first transmitted the signal for wireless connection;
comparing the selection information of the plurality of external devices and selecting an optimal external device from among the plurality of external devices based on the comparing the selection information of the plurality of external devices, without referring to, in advance, a reference value of the selection information for the comparing;
if the first external device is verified to be different from the optimal external device based on a result of the comparing the selection information of the plurality of external devices, terminating the wireless connection to the first external device and establishing a wireless connection to the optimal external device;
wherein the selection information is at least one of a received signal strength (RSS) value of the signal for wireless connection that is transmitted by each external device of the plurality of external devices, and a round trip time (RTT) value between the one of the plurality of external devices and the wireless connection device.

11. The method of claim 10, wherein an external device corresponding to a largest RSS value is selected as the optimal external device.

12. The method of claim 10, wherein an external device corresponding to a smallest RTT value is selected as the optimal external device.

13. The method of claim 10, wherein the generating selection information comprises generating corresponding selection information only with respect to external devices that transmitted the signal for wireless connection during a predetermined wait time.

14. The method of claim 10, wherein the signal for wireless connection is a signal responding to a wireless connection request transmitted by one of the plurality of external devices corresponding to a signal requesting wireless connection transmitted by the wireless connection device.

15. The method of claim 14, further comprising:
generating a button input signal in response to an input from a user; and
transmitting the signal requesting wireless connection in response to the button input signal.

16. The method of claim 15, wherein the button input signal is a signal generated when a user presses a physical button or manipulates a software interface.

17. The method of claim 10, wherein the establishing wireless connection to the first external device is performed immediately after the receiving the signal for wireless connection from the first external device is performed.

18. The method of claim 10, further comprising:
receiving a signal for requesting a wireless connection from one of the plurality of external devices;
generating a button input signal in response to an input from a user; and
transmitting a signal responding to the wireless connection request to the one of the plurality of external devices in response to the button input signal.

19. A non-transitory computer-readable recording medium storing a computer-readable program which when executed by a computer performs a method of wireless connection, the method comprising:
generating selection information with respect to each external device of a plurality of external devices that transmitted signals for wireless connection;
establishing wireless connection to a first external device, among the plurality of external devices, that first transmitted the signal for wireless connection;
comparing the selection information of the plurality of external devices and selecting an optimal external device from among the plurality of external devices based on the comparing the selection information of the plurality of external devices, without referring to, in advance, a reference value of the selection information for the comparing;
verifying whether the first external device is different from the optimal device; and
based on a result of the verification that the first external device is different from the optimal external device, terminating the wireless connection to the first external device and establishing a wireless connection to the optimal external device;
wherein the selection information is at least one of a received signal strength (RSS) value of the signal for wireless connection that is transmitted by each external device of the plurality of external devices, and a round trip time (RTT) value between the one of the plurality of external devices and the wireless connection device.

* * * * *